United States Patent
Sakaguchi et al.

(10) Patent No.: US 10,884,427 B2
(45) Date of Patent: Jan. 5, 2021

(54) TRAVEL ROUTE GENERATING DEVICE AND METHOD FOR GENERATING TRAVEL ROUTE

(71) Applicant: Kubota Corporation, Osaka (JP)

(72) Inventors: Kazuo Sakaguchi, Amagasaki (JP); Megumi Suzukawa, Amagasaki (JP); Sakura Tomita, Amagasaki (JP); Yuji Okuyama, Amagasaki (JP)

(73) Assignee: KUBOTA CORPORATION, Osaka (JP)

(*) Notice: Subject to any disclaimer, the term of this patent is extended or adjusted under 35 U.S.C. 154(b) by 406 days.

(21) Appl. No.: 15/788,808

(22) Filed: Oct. 20, 2017

(65) Prior Publication Data

US 2018/0113471 A1     Apr. 26, 2018

(30) Foreign Application Priority Data

Oct. 26, 2016 (JP) ................................ 2016-209968

(51) Int. Cl.
    *G05D 1/02*       (2020.01)
    *A01B 69/04*     (2006.01)
    (Continued)

(52) U.S. Cl.
    CPC ......... *G05D 1/0274* (2013.01); *A01B 69/008* (2013.01); *G01C 21/00* (2013.01);
    (Continued)

(58) Field of Classification Search
CPC ... G05D 1/0274; G05D 1/0214; G05D 1/0219
See application file for complete search history.

(56) References Cited

U.S. PATENT DOCUMENTS

| 5,625,559 A | * | 4/1997 | Egawa | ............. | G05B 19/41895 |
| | | | | | 701/117 |
| 6,205,380 B1 | * | 3/2001 | Bauer | .................. | G05D 1/0221 |
| | | | | | 180/169 |

(Continued)

FOREIGN PATENT DOCUMENTS

| CN | 103699135 | 4/2014 |
| JP | 06-337716 | 12/1994 |

(Continued)

OTHER PUBLICATIONS

Japanese Office Action for corresponding JP Application No. 2016-209968, dated Nov. 8, 2019 (w/ machine translation).

(Continued)

*Primary Examiner* — Donald J Wallace
(74) *Attorney, Agent, or Firm* — Mori & Ward, LLP

(57) ABSTRACT

A travel route generating device for a work vehicle includes a cell memory to store cell information with respect to cells obtained by dividing a topographical map of a work field in which the work vehicle works. A travel probability memory is to store a travel probability with respect to each of the cells. The travel probability includes a left-turn travel probability, a straight travel probability, and a right-turn travel probability in each of the cells. Circuitry is configured to determine a travel direction in each of the cells based on the travel probability of each of the cells. The work vehicle is configured to travel through each of the cells in the travel direction. The circuitry is configured to change the travel probability with respect to affected cells affected by moving the work vehicle through each of the cells.

15 Claims, 5 Drawing Sheets

(51) Int. Cl.
  *G01C 21/00* (2006.01)
  *G01C 21/34* (2006.01)
(52) U.S. Cl.
  CPC ............ *G01C 21/34* (2013.01); *G05D 1/021* (2013.01); *G05D 1/0214* (2013.01); *G05D 1/0278* (2013.01); *G05D 2201/0201* (2013.01)

(56) References Cited

U.S. PATENT DOCUMENTS

| | | | |
|---|---|---|---|
| 6,728,607 B1 | 4/2004 | Anderson | |
| 10,231,374 B2* | 3/2019 | Sakaguchi | G05D 1/0214 |
| 2004/0117079 A1* | 6/2004 | Hulden | G05D 1/0217 |
| | | | 701/23 |
| 2005/0107950 A1* | 5/2005 | Gelhar | G01C 21/3446 |
| | | | 340/990 |
| 2007/0005306 A1* | 1/2007 | Foessel | G01S 13/723 |
| | | | 702/189 |
| 2007/0219720 A1* | 9/2007 | Trepagnier | B60W 30/00 |
| | | | 701/300 |
| 2008/0009966 A1* | 1/2008 | Bruemmer | G06N 3/008 |
| | | | 700/245 |
| 2008/0091340 A1 | 4/2008 | Milstein et al. | |
| 2012/0036229 A1* | 2/2012 | Uyama | G01C 21/34 |
| | | | 709/219 |
| 2016/0282870 A1* | 9/2016 | Yamamura | G05D 1/0088 |
| 2017/0199525 A1* | 7/2017 | Albaghajati | H04B 7/18523 |
| 2017/0344007 A1* | 11/2017 | Song | G06N 7/005 |
| 2018/0004198 A1* | 1/2018 | Dabrowski | G05D 1/0005 |
| 2018/0004217 A1* | 1/2018 | Biber | G05D 1/0221 |
| 2018/0011495 A1* | 1/2018 | Sakaguchi | A01B 69/008 |
| 2018/0107226 A1* | 4/2018 | Yang | G05D 1/0246 |

FOREIGN PATENT DOCUMENTS

| | | |
|---|---|---|
| JP | 2004-16010 | 1/2004 |
| JP | 2008-067617 | 3/2008 |
| JP | 2012-110996 | 6/2012 |

OTHER PUBLICATIONS

Japanese Office Action for corresponding JP Application No. 2016-209968, dated Apr. 15, 2020 (w/ machine translation).
Japanese Office Action for corresponding JP Application No. 2016-209968, dated Sep. 7, 2020 (w/ machine translation).

* cited by examiner

TRAVEL ROUTE GENERATING DEVICE AND METHOD FOR GENERATING TRAVEL ROUTE

CROSS-REFERENCE TO RELATED APPLICATIONS

The present application claims priority under 35 U.S.C. § 119 to Japanese Patent Application No. 2016-209968, filed Oct. 26, 2016. The contents of this application are incorporated herein by reference in their entirety.

BACKGROUND OF THE INVENTION

Field of the Invention

The present invention relates to a travel route generating device and a method for generating a travel route.

Discussion of the Background

Japanese Patent Application Laid-open No. 2008-67617 discloses an agricultural work vehicle configured to generate a straight teaching route connecting a start point as a vehicle position upon teaching start and an end point as a vehicle position upon teaching end, and generate N straight travel routes distant by a work width and parallel to the straight teaching route. The agricultural work vehicle generates only the plurality of straight travel routes parallel to the straight teaching route. The agricultural work vehicle cannot generate any travel route if the agricultural work vehicle does not execute teaching travel in an actual field. The generated travel routes include no turn travel route for redirection in an outer peripheral area of the work field. This travel route generation technique is thus applicable only under highly limited conditions.

U.S. Pat. No. 6,728,607 discloses a travel route generation system configured to generate a travel route achieving minimized energy consumption. This system initially estimates levels of energy necessary for passing cells obtained by mesh-dividing a work field in accordance with altitudes of the cells, and allocates, to the cells, numerical values indicating the estimated energy levels. The system subsequently applies the cells to a plurality of planned travel routes for a work vehicle in the work field, compares sums of the necessary energy levels for travel along the planned travel routes, and adopts the travel route having the lowest sum of the energy levels as an actual travel route. The travel route generation system is configured to compare the different travel routes by calculating the sums of the energy levels for the travel along the planned travel routes. The system is, however, not configured to plan the travel routes themselves. U.S. Pat. No. 6,728,607 merely suggests two types of travel routes including a plurality of parallel straight routes extending in the east-west direction or in the south-north direction and U-turn routes each connecting the straight routes adjacent to each other.

SUMMARY OF THE INVENTION

According to one aspect of the present invention, a travel route generating device for a work vehicle includes a cell memory, a travel probability memory, and circuitry. The cell memory is to store cell information with respect to cells obtained by dividing a topographical map of a work field in which the work vehicle works. The travel probability memory is to store a travel probability with respect to each of the cells. The travel probability includes a left-turn travel probability, a straight travel probability, and a right-turn travel probability in the each of the cells. The circuitry is configured to determine a travel direction in the each of the cells based on the travel probability of the each of the cells. The work vehicle is configured to travel through the each of the cells in the travel direction. The circuitry is configured to change the travel probability with respect to affected cells affected by moving the work vehicle through the each of the cells.

According to another aspect of the present invention, a method for generating a travel route for a work vehicle is disclosed. The method includes dividing a topographical map of a work field to provide cells. The work vehicle works in the work field. The method includes providing a travel probability with respect to each of the cells, the travel probability including a left-turn travel probability, a straight travel probability, and a right-turn travel probability in the each of the cells. The method includes determining a travel direction in the each of the cells based on the travel probability of the each of the cells, the work vehicle being configured to travel through the each of the cells in the travel direction. The method includes changing the travel probability with respect to affected cells affected by moving the work vehicle through the each of the cells.

According to further aspect of the present invention, a travel route generating device for a work vehicle includes cell memory means, travel probability memory means, travel direction determining means, and travel probability changing means. The cell memory means are for storing cell information with respect to cells obtained by dividing a topographical map of a work field in which the work vehicle works. The travel probability memory means are for storing a travel probability with respect to each of the cells, the travel probability including a left-turn travel probability, a straight travel probability, and a right-turn travel probability in the each of the cells. The travel direction determining means are for determining a travel direction in the each of the cells based on the travel probability of the each of the cells, the work vehicle being configured to travel through the each of the cells in the travel direction. The travel probability changing means are for changing the travel probability with respect to affected cells affected by moving the work vehicle through the each of the cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
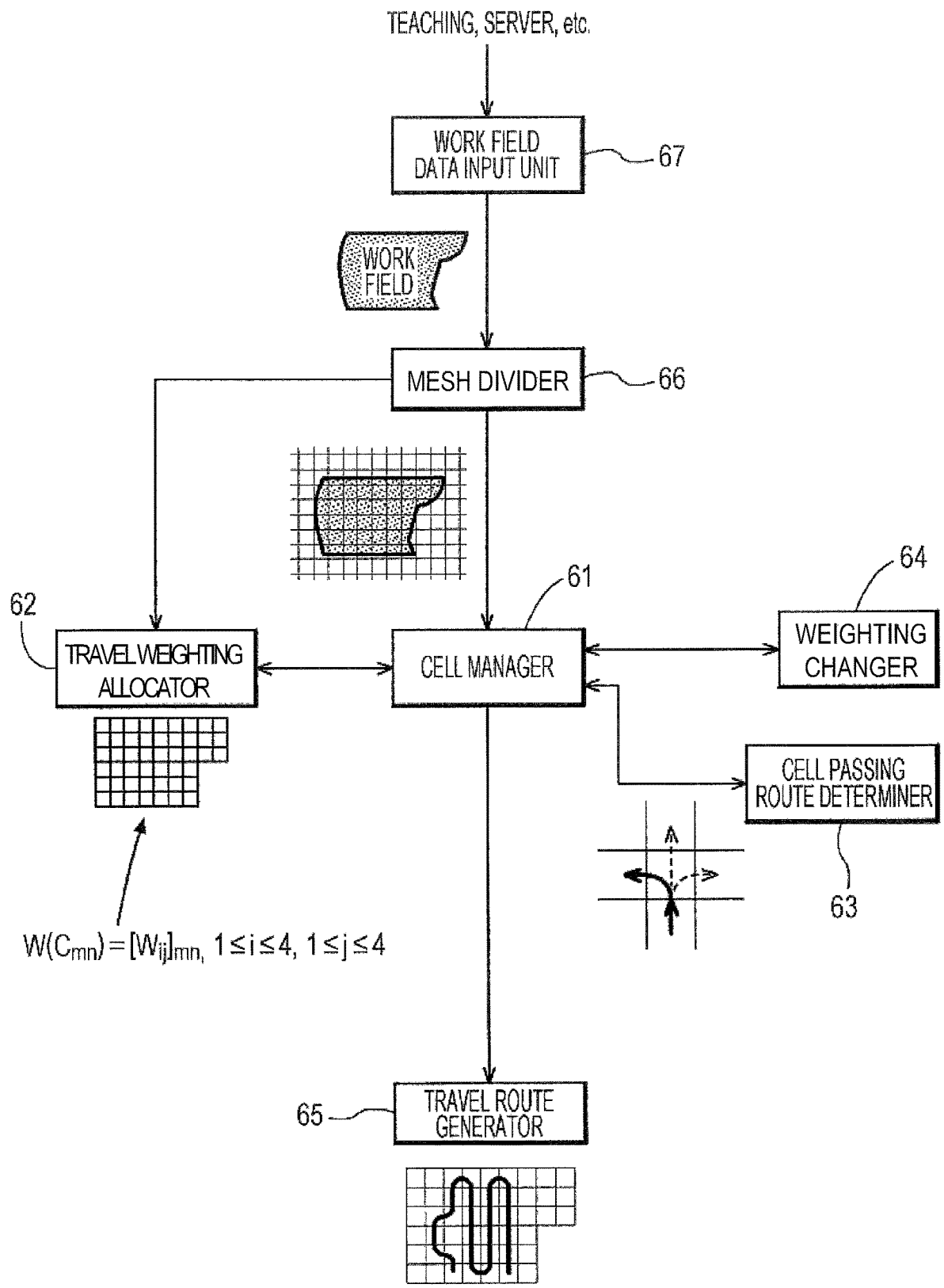
FIG. 1 is a configuration diagram of an exemplary route generating device.

The embodiments will now be described with reference to the accompanying drawings, wherein like reference numerals designate corresponding or identical elements throughout the various drawings.

FIG. 1 is a configuration diagram of an exemplary travel route generating device configured to generate a travel route for a work vehicle that works while traveling in a work field. The travel route generating device initially divides a work field with meshes into a large number of cells. The travel route generating device allocates a weight (a probability) given to each cell passing route of passing the divided cells, namely, each of a left-turn route, a straight travel route, and a right-turn route, and sequentially determines cell passing routes of passing the cells in accordance with the weights. The travel route generating device generates a travel route for the work vehicle by sequentially connecting the determined cell passing routes. The initially allocated weights are changed if the determined cell passing routes influence the weights. The travel route generating device thus includes basic functional units of a cell manager 61, a travel weighting allocator 62, a cell passing route determiner 63, a weighting changer 64, and a travel route generator 65. The travel route generating device is substantially configured by a computer system configured to execute computer simulation. Each of the functional units executes a program to achieve a specific function, and can alternatively be structured at least partially by hardware.

FIG. 1 exemplifies the travel route generating device including, as a data input unit, a work field data input unit 67 configured to receive, from outside, topographical map data including an outline of the work field. The travel route generating device includes a mesh divider 66 configured to approximate the outline of the work field provided from the work field data input unit 67 to a circumscribing rectangle, and mesh-divide the circumscribing rectangle by a side length (a predetermined interval) obtained from a work width of the work vehicle in consideration of overlap. The work field has outer end cells treated as special cells prohibiting passage to outside the work field. The cell manager 61 manages cell passing simulation of sequentially passing a large number of cells obtained by mesh generation.

If there is any travel pattern to be prioritized (e.g. repeated straight travel in the east-west direction or spiral travel) in accordance with the topographical map of the work field and attribute information on the work field (e.g. ground tilts and a type of work), the cell manager 61 commands allocation of weights to the cells so as to prioritize the travel pattern. If the attribute information includes positional information on an obstacle disturbing travel, the cell manager 61 commands allocation of weights to the cells so as to prohibit travel to the obstacle. The cell manager 61 designates a start point cell as a start point of the travel route.

The travel weighting allocator 62 allocates, to each of the cells, weights, namely, a weight given to left-turn travel, a weight given to straight travel, and a weight given to right-turn travel, indicative of travel effect degrees in respective cell passing directions upon travel from a cell to one of the cells adjacent thereto, in accordance with the command from the cell manager 61. These weights can be indicated by numerical values or symbols. The weights treated as probability values each may have a numerical value from zero to one. The cell passing route determiner 63 determines how to pass the entered cell in accordance with the weights (the probabilities) allocated to the cell. The cell passing route determiner 63 determines a cell passing route (a travel direction) in accordance with the easiest manner of selecting the cell passing route having the weight with a large value. When determination is made in accordance with such probability, a cell passing route is determined probabilistically in accordance with the weight as a probability value allocated to each cell passing route. In this case, a cell passing route having a higher probability value is more likely to be selected but is not necessarily selected.

Figure 2:
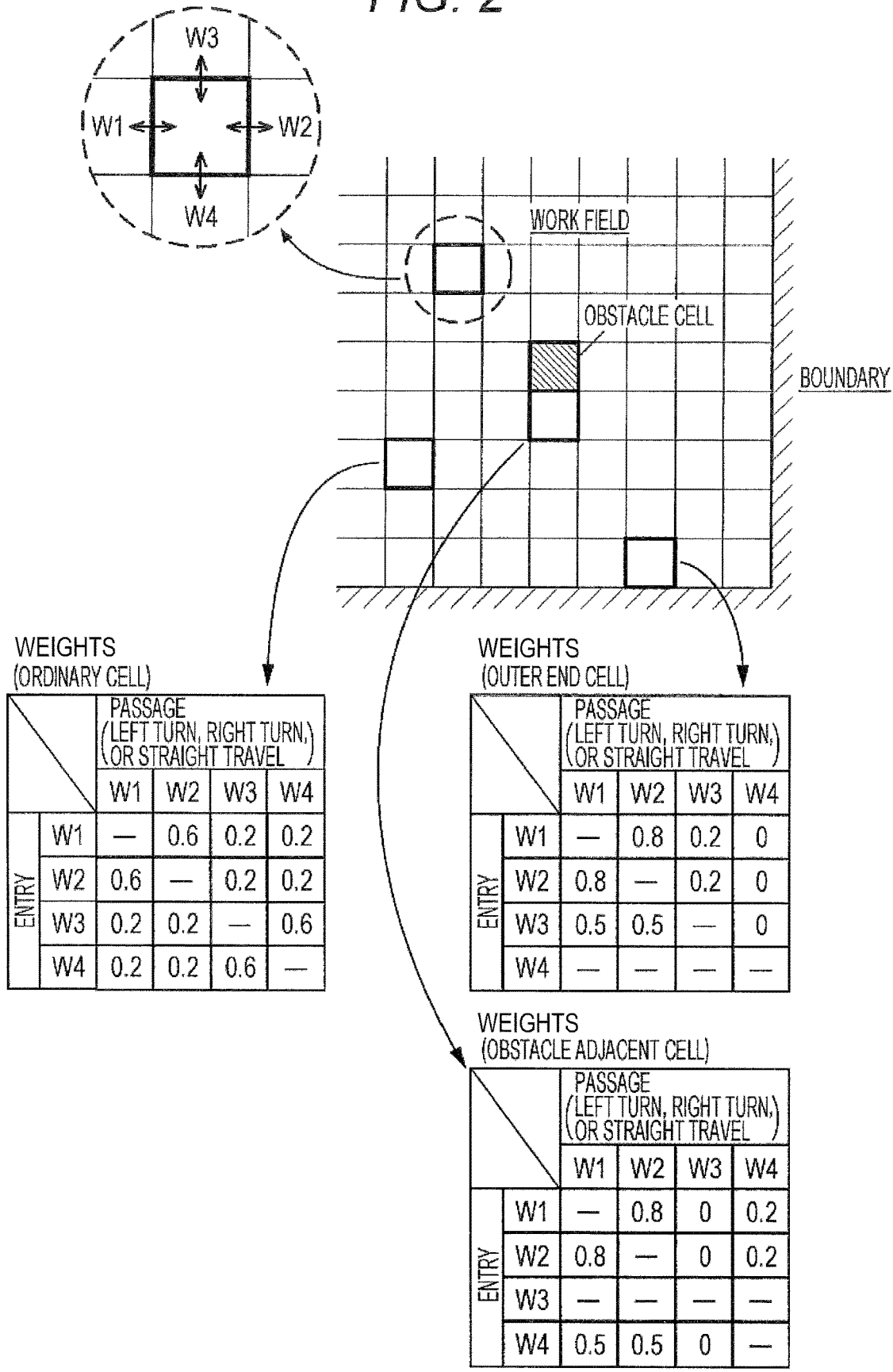
FIG. 2 is an explanatory view of allocation of weights given to travel s to mesh-divided cells.

FIG. 2 graphically depicts allocation of weights to the cells. As depicted in FIG. 2, respective sides of each cell are identified by symbols W1, W2, W3, and W4, which exemplify the left or west side, the right or east side, the upper or north side, and the lower or south side, respectively. The cell passing routes include left turn, straight travel, and right turn. In an exemplary case where a cell passing route enters the side W1, left turn includes passage of the side W2, straight travel includes passage of the side W2, and right turn includes passage of the side W4. Each of the cells is thus provided with weights given to travels for three passing routes of left turn, straight travel, and right travel, for each of the four sides to be entered.

FIG. 2 depicts, in a matrix form, exemplary weights given to travels which are allocated to one of the outer end cells in contact with the boundary with the outside, one of obstacle adjacent cells located adjacent to an obstacle cell including an obstacle, and one of ordinary cells. The cells obtained by mesh generation are indicated by Cmn as a matrix of m×n. Each of the cells has weights given to travels indicated by a matrix $W(Cmn)=[Wij]$ mn, $1 \leq i \leq 4$, $1 \leq j \leq 4$, as apparent from charts in FIG. 2.

Specifically, one of the outer end cells having an entry position at the side W1 has a weight "0.8" given to straight travel with an exit position at the side W2, a weight "0.2" given to left turn with an exit position at the side W3, and a weight "0" given to right turn with an exit position at the side W4. Straight travel, which is regarded as achieving high work efficiency in this case, has the higher weight. Right turn at this cell causes the work vehicle to travel beyond the boundary and is thus prohibited with the weight "0". A case with an entry position at the side W2 is similar to the case with the entry position at the side W1. Straight travel is prohibited in a case with an entry position at the side W3. Right turn and left turn thus equally have a weight "0.5". When the cell has equal weights, determination can be made in accordance with preset priority ranking or random numbers. An entry position at the side W4 is impossible and disregarded, which is thus indicated by a symbol "-". Cases where the entry position is identical with the exit position are disregarded at all the cells and are thus indicated by the symbol "-".

One of the obstacle adjacent cells has weights given to travels similar to those of the outer end cells, including the weight "0" given to a cell passing route of entering the obstacle cell. An obstacle in the work field is avoided in principle during travel. A high weight is thus allocated to a cell passing route of surrounding the obstacle cell. FIG. 2 exemplifies the case with the entry position at the side W1. Straight travel with the exit position at the side W2 leads to travel of surrounding the obstacle cell and thus has the high weight "0.8". In contrast, right turn with the exit position at the side W4 leads to travel to be distant from the obstacle cell and thus has the low weight "0.2". The entry position at the side W3 is impossible and disregarded, and is thus indicated by the symbol "-".

Free cells including neither outer end cells nor obstacle adjacent cells can have equal weights given to travels. Under a precondition of prioritizing straight travel in this case, a cell passing route of straight travel is higher in weight than cell passing routes of left turn and right turn.

The weighting changer 64 changes the weights (the probabilities) given to travels allocated by the travel weighting allocator 62. Causes for change of the weights given to travels by the weighting changer 64 include a travel condition of prohibiting or avoiding as much as possible reentry to an already passed cell. Specifically, when the adjacent cell is already passed, a cell passing route of entering the already passed cell has a weight changed to "0" or approximated to "0". The causes also include a travel condition of considering a travel locus involving a plurality of cells continuously passed to reach a cell to be evaluated. In a case where the latest travel has a straight locus in an area prioritizing straight travel, the weights given to travels are changed to continue straight travel as much as possible. In another case where the latest travel has a turn travel locus in an area often covered by U-turn travel or right-angle turn travel, the weights given to travels are changed to continue turn travel as much as possible.

The travel route generator 65 connects the cell passing routes sequentially determined by the cell passing route determiner 63 to generate a travel route for actual travel in the work field by the work vehicle. The cell manager 61 is configured to calculate time for passing each cell by left turn, time for passing the cell by straight travel, and time for passing the cell by right turn, in accordance with set vehicle speed, and manage the time. The cell manager 61 is thus also configured to integrate the time for passing the cells configuring a finally generated travel route, to calculate halfway travel elapsed time or travel end time for the work vehicle traveling on the travel route.

Figure 3:
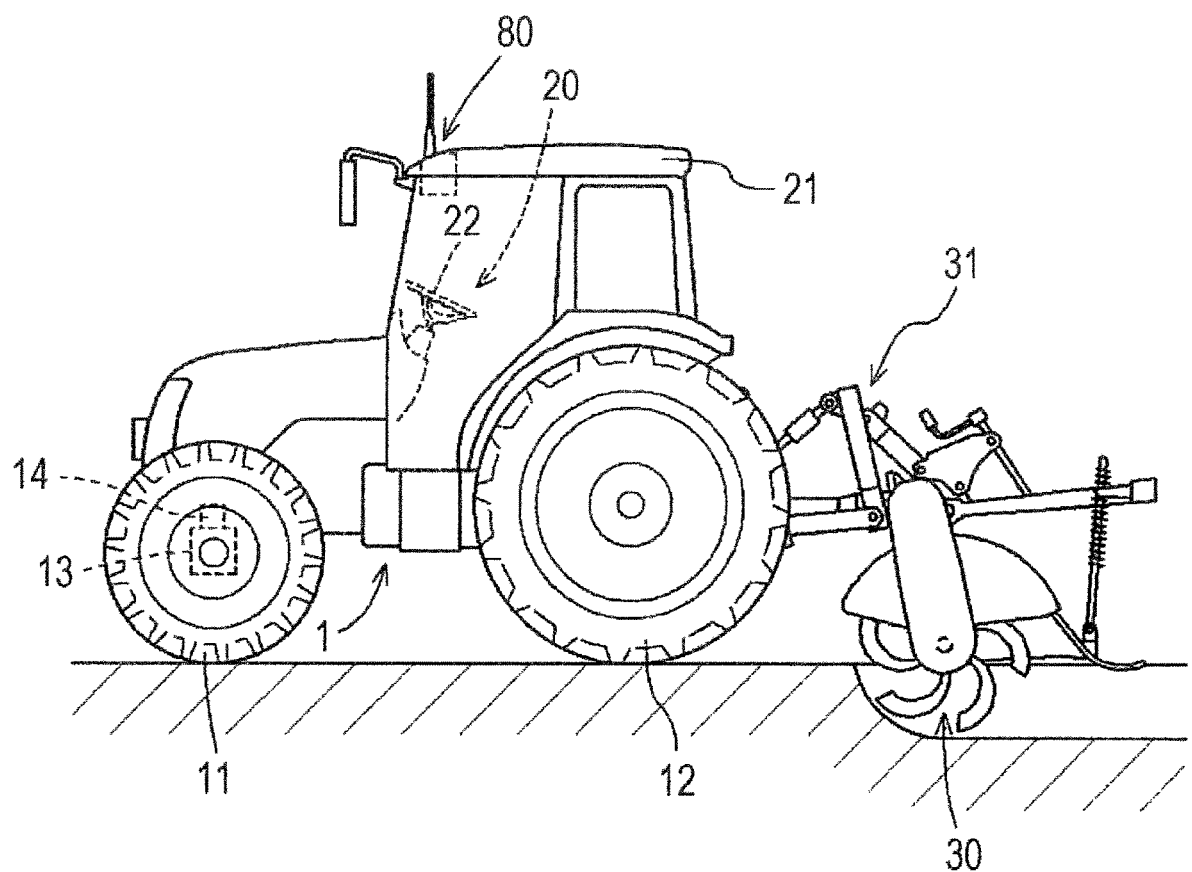
FIG. 3 is a side view of a tractor exemplifying a work vehicle configured to travel in a manned or unmanned state along a travel route generated by the route generating device.

FIG. 3 depicts a tractor exemplifying a work vehicle configured to travel in a manned or unmanned state along a travel route generated by the route generating device described above. This tractor is equipped with, as a work device 30, a rotary tiller configured to till a field (work field) bordered with a ridge. The tractor is provided with an operation unit 20 at a center portion of a vehicle body 1 supported by front wheels 11 and rear wheels 12. The vehicle body 1 has a rear portion supporting the work device 30 vertically shiftable via a hydraulic lifting mechanism 31. The front wheels 11 function as steering control wheels, and the tractor is redirected by changing a steering angle of the front wheels. The steering angle of the front wheels 11 is changed by actuating a steering mechanism 13. The steering mechanism 13 includes a steering motor 14 for automatic steerage. The front wheels 11 can be controlled by operating a steering wheel 22 disposed at the operation unit 20 during manual travel. The tractor has a cabin 21 provided with a satellite positioning module 80 configured as a GNSS module. Constituent elements of the satellite positioning module 80 include a satellite antenna configured to receive GPS signals and GNSS signals and attached to a ceiling area of the cabin 21. The satellite positioning module 80 can include an inertial navigation module provided with a gyro acceleration sensor and a magnetic direction sensor in order for complementation of satellite navigation. The inertial navigation module can alternatively be disposed at a location different from the satellite positioning module 80.

Figure 4:
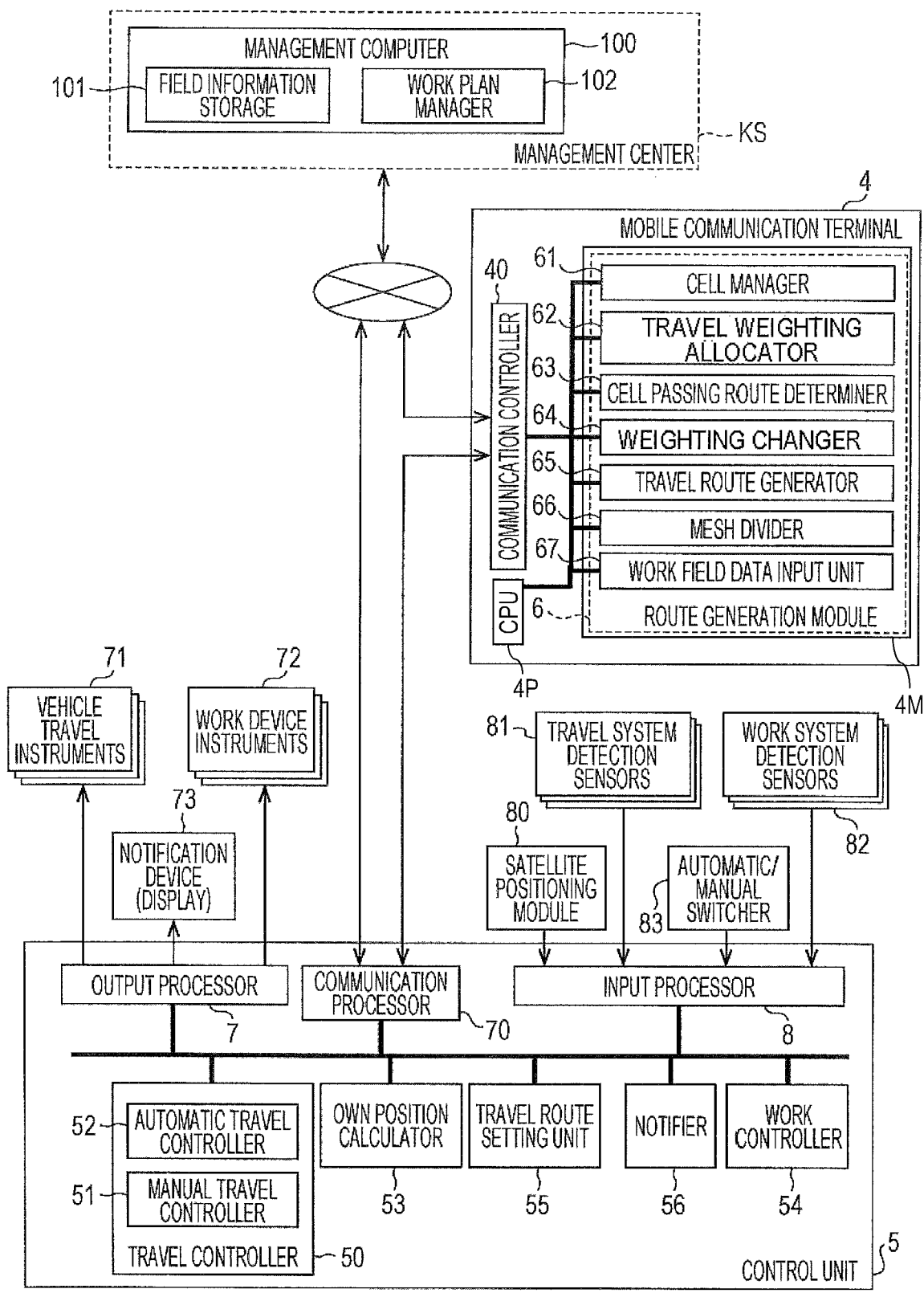
FIG. 4 is a block diagram depicting a configuration of a mobile communication terminal as the route generating device and the tractor.

FIG. 4 depicts a control system mounted on the tractor, and a control system of a mobile communication terminal 4 carried by a supervisor (driver) supervising drive operation of the tractor. The mobile communication terminal 4 according to this embodiment is provided with a route generation module 6 obtained by modularizing the route generating device described with reference to FIGS. 1 and 2. The route generation module 6 thus basically includes the cell manager 61, the travel weighting allocator 62, the cell passing route determiner 63, the weighting changer 64, the travel route generator 65, the work field data input unit 67, and the mesh divider 66. These units have the basic functions described above. Specifically, the mobile communication terminal 4 includes a central processing unit (CPU) 4P (circuitry 4P) and a memory 4M. Programs and data of the route generation module 6 including the cell manager 61, the travel weighting allocator 62, the cell passing route determiner 63, the weighting changer 64, the travel route generator 65, the work field data input unit 67, and the mesh divider 66 are stored in the memory 4M. The programs are executed by the CPU 4P to perform a function of the route generation module 6. The memory 4M is an example of a cell memory and a travel probability memory.

The mobile communication terminal 4 includes the route generation module 6, as well as various functional units of an ordinary computer system, like a communication controller 40 and a display unit. The mobile communication terminal 4 is connectable with a control unit 5 as a core element in the control system of the tractor, so as to achieve data exchange by wireless or wired communication. The mobile communication terminal 4 is further configured to exchange data through a wireless line or the Internet, with a management computer 100 provided in a remote management center KS. The management computer 100 according to this embodiment includes a field information storage 101 storing field information including the topographical map of a field as a work field, field attribute information, and the like, which is necessary for generation of a travel route by the route generation module 6. The field information includes an entrance-exit port of the field, ground tilts of the field, a position of an obstacle in the field, and the like. The management computer 100 further includes a work plan manager 102 configured manage a work plan document describing travel work in a designated field. The mobile communication terminal 4 accesses the management computer 100, to sample and download field information on the field as a work target, from the field information storage 101. The work field data input unit 67 receives a downloaded outline view of the field.

The control unit 5 as the core element of the control system of the tractor includes an output processor 7 and an input processor 8, which function as an input and output interface, and a communication processor 70. The output processor 7 is connected to vehicle travel instruments 71, work device instruments 72, a notification device 73, and the like, which are mounted on the tractor. The vehicle travel instruments 71 include the steering motor 14, and instruments to be controlled for vehicle travel, such as a transmission mechanism and an engine unit (not depicted). The work device instruments 72 include a drive mechanism for the work device 30, the lifting mechanism 31 configured to vertically shift the work device, and the like. The notification device 73 includes a display, a lamp, and a speaker. The display particularly displays the outline of the field, as well as various notification information on an already passed travel route (a travel locus), a travel route to be covered, and the like. The lamp and the speaker are used to notify the driver or the supervisor of caution information and warning information such as travel precaution and deviation from a target travel route during automatic steering travel. The communication processor 70 has a function of transmitting data processed by the control unit 5 to the management computer 100 and receiving various types of data from the management computer 100.

The input processor 8 is connected to, the satellite positioning module 80, travel system detection sensors 81, work system detection sensors 82, an automatic/manual switcher 83, and the like. The travel system detection sensors 81 include a sensor configured to detect a travel state such as engine rotational speed or a transmission state. The work system detection sensors 82 include a sensor configured to detect a position and a tilt of the work device 30, a sensor configured to detect a workload, and the like. The automatic/manual switcher 83 is configured to select either an automatic travel mode for automatic steering travel or a manual steering mode for manual steering travel.

The control unit 5 further includes a travel controller 50, a work controller 54, an own position calculator 53, a travel route setting unit 55, and a notifier 56. The own position calculator 53 calculates an own position in accordance with positioning data transmitted from the satellite positioning module 80. This tractor is configured to travel both in the automatic travel (automatic steering) mode and the manual travel (manual steering) mode, the travel controller 50 configured to control the vehicle travel instruments 71 includes a manual travel controller 51 and an automatic travel controller 52. The manual travel controller 51 controls the vehicle travel instruments 71 in accordance with operation of the driver. The automatic travel controller 52 calculates directional deviation and positional deviation between the travel route set by the travel route setting unit 55 and the own position, generates an automatic steering command, and transmits the generated automatic steering command to the steering motor 14 via the output processor 7. The work controller 54 transmits a control signal to the work device instruments 72 in order to control operation of the work device 30. The notifier 56 generates a notification signal (display data or voice data) for notification to the driver or the supervisor of necessary information through the notification device 73 including the display and the like.

The travel route setting unit 55 receives the travel route generated by the route generation module 6 from mobile communication terminal 4 via the communication processor 70, and sets the received travel route as a target travel route. The tractor is driven to a start point indicated on the travel route upon start of work. The tractor is then made to travel along the set travel route automatically or manually.

Figure 5:
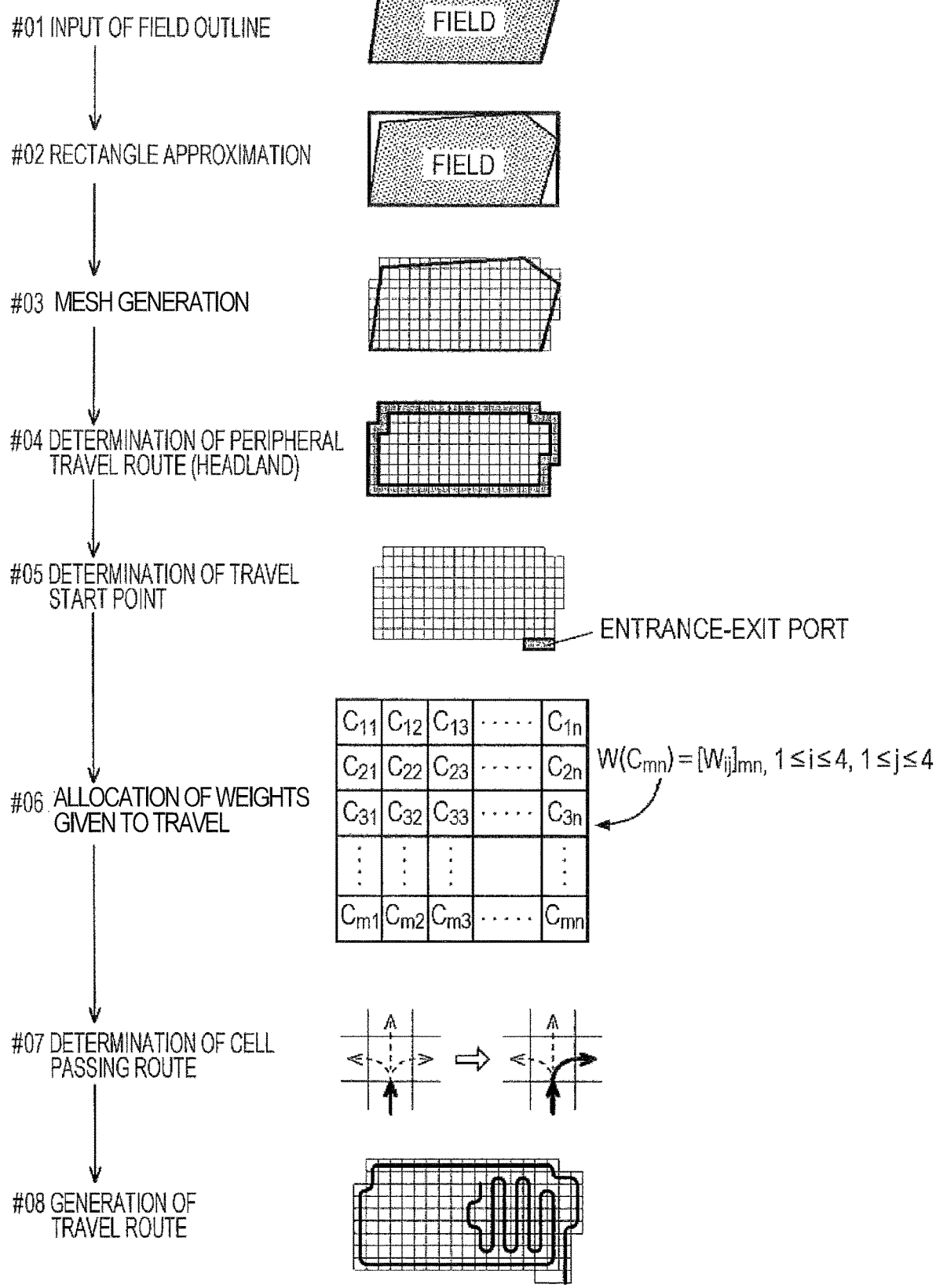
FIG. 5 is a flowchart exemplifying a travel route generation procedure.

Described next with reference to FIG. 5 is exemplary travel route generation processing of mesh-dividing the filed, allocating weights given to travels to each of obtained cells, and searching for a travel route in accordance with the weights given to travels.

(#01) Input of Field Outline

The work field data input unit 67 samples the outline from the received topographical map of the field, and develops the outline in a working area of the mesh divider 66.

(#02) Rectangle Approximation

There is generated an approximated rectangle circumscribing the sampled outline of the field.

(#03) Mesh Generation

The approximated rectangle is divided into a large number of cells with meshes parallel to the sides of the approximated rectangle and each having a side with a value (travel work width) obtained by subtracting a predetermined overlapping amount from the work width of the work device 30.

(#04) Determination of Peripheral Travel Route (Headland)

In tilling work by the tractor, an area having a predetermined width (obtained by integral multiplication of the travel work width) from the outer periphery is determined as headland for turn, parking, and the like of the tractor. A travel route for formation of the headland is a peripheral travel route for travel along the outline and typically counterclockwise. A plurality of times of entry to and travel on the peripheral travel route already covered are allowed exceptionally. If work requires no consideration of formation of the peripheral travel route, this step is excluded.

(#05) Determination of Travel Start Point

The field information downloaded from the management computer 100 includes positional data on the entrance-exit port of the field, and a cell corresponding to the position of the tractor entered through the entrance-exit port is regarded as the start point cell and an end point cell.

(#06) Allocation of Weights Given to Travels

According to this embodiment, the weights given to travels described with reference to FIG. 2 are allocated to the cells located inside the peripheral travel route (headland). In a case where the field information includes obstacle data on a position of an untravelable site having an obstacle or the like, cells belonging to the untravelable site are regarded as obstacle cells (untravelable cells) and are not provided with weights given to travels. The cells configuring the entire field can be treated as matrix elements [$C11$ to $C1n$, ... and $Cm1$ to $Cmn$], which allows easy designation of a specific cell. The weights given to travels which are allocated to the cells can also be treated as matrix elements (vectors) as described above. In a case where the weights given to travels are configured as depicted in FIG. 2, weights given to travels at a specific cell are expressed by $W(Cmn)=[Wij]$ mn, $1 \le i \le 4$, $1 \le j \le 4$. The weights given to travels at each of the cells are calculated in accordance with a positional relation with the obstacle cell, a positional relation with the peripheral travel route, a basic travel pattern (prioritizing long straight travel, prioritizing spiral travel, prioritizing a specific turn direction, or the like), and the calculated weights given to travels are allocated to the cell.

(#07) Determination of Cell Passing Route

When the weights given to travels are allocated to all the cells, cell passing routes are sequentially determined from the start point cell with reference to the weights given to travels. The weighting changer 64 changes the weights given to travels at a specific cell influenced by passage of other cells. When the route reaches a dead end although there is any unpassed cell, backtracking is executed to return to the most recently passed cell for selection of a different passing route and search for a different travel route.

(#08) Generation of Travel Route

When cell passing routes of all the cells to be passed are determined, the cell passing routes are connected in order of the determination for generation of a travel route. Time for travel on the generated travel route is calculated, inclusive of halfway elapsed time.

Such generation of a travel route can be executed only once or a plurality of times. Weights given to travels at each of the cells are calculated again in accordance with a changed basic travel pattern, and cell passing routes are determined again in accordance with the revised weights given to travels. If there is generated a plurality of travel routes, the travel route having the shortest travel time can be selected for improved work efficiency.

Other Embodiments (1) The above embodiment assumes that the single work vehicle (tractor) executes work on the work field (field). The present invention is also applicable to generation of travel routes for work executed by a plurality of work vehicles. Management of time for passing the cells by each of the work vehicles will achieve generation of travel routes for cooperative travel by the plurality of work vehicles traveling together on the work field.

(2) The functional units in the block diagram depicted in FIG. 4 are classified mainly for convenience of the description. Each of the functional units can be integrated with a different one of the functional units, or can be divided into a plurality of functional units. For example, the route generation module 6 can be provided at the management computer 100, and the generated travel route can be downloaded to the control unit 5 of the work vehicle. The route generation module 6 can still alternatively provided at the control unit 5 of the work vehicle.

(3) The work vehicle according to the above embodiment is exemplified by the tractor equipped with the rotary tiller as the work device 30. Examples of the work vehicle according to the embodiment include, in addition to the tractor, agricultural work vehicles such as a rice transplanter, a fertilizer distributor, and a combine harvester.

According to the embodiments, a travel route generating device is configured to generate a travel route for a work vehicle that works while traveling in a work field, and the travel route generating device includes: a cell manager configured to manage a large number of cells obtained by generating meshes in a topographical map of the work field at a predetermined interval; a travel weighting allocator configured to allocate to one of the cells, as weights given to travels, a weight given to left-turn travel, a weight given to straight travel, and a weight given to right-turn travel, the weights each indicating a travel effect degree in each cell passing direction upon travel from the cell to one of cells adjacent thereto; a cell passing route determiner configured to determine a cell passing route of passing the cell in accordance with the weight given to the left-turn travel, the weight given to the straight travel, and the weight given to the right-turn travel allocated to the cell; a weighting changer configured to change the weights given to travels which are allocated to a cell influenced by passage of the cell; and a travel route generator configured to generate the travel route by connecting the cell passing routes sequentially determined by the cell passing route determiner.

In this configuration, the weights are allocated in accordance with manners of passing the cells obtained by mesh generation (passing by left turn, by straight travel, and by right turn). Left turn, straight travel, and right turn in each of the cells differ from one another dependently on a position of entry to the cell. The weights of the cell are allocated in each direction of entry to the cell. Exemplarily assume that an entry direction from the west to the east is called a first entry direction, an entry direction from the east to the west is called a second entry direction, an entry direction from the north to the south is called a third entry direction, and an entry direction from the south to the north is called a fourth entry direction. A weight given to left turn, a weight given to straight travel, and a weight given to right turn are allocated in each of the four entry directions, so that at most twelve weights are allocated to each of the cells. The cell passing route determiner sequentially evaluates the weights allocated to each entered cell, and determines a passing route (left turn, straight travel, or right turn) of the cell. The cell passing routes sequentially determined by the cell passing route determiner are connected to generate a target travel route for the work vehicle traveling in the work field. A desired travel route is generated by preliminarily setting weights given to travels which define the desired travel route. The work vehicle travels along the targeted work route in a manned or unmanned state. The travel route generating device generates a desired travel route if a travel route planner preliminarily sets weights given to travels which are appropriate for the cells obtained by mesh generation as reference information indicating how the work vehicle should pass the work field (e.g. straight routes elongated in the east-west direction or in the south-north direction, and a spiral route mainly including turn travel route).

The work vehicle needs to travel all over the work field depending on a type of work. It is important to minimize unpassed cells upon generation of a travel route for the work vehicle. In view of this, according to the embodiments, the cell manager executes backtracking when the route reaches a dead end with the cells including an unpassed cell. The cell manager designates again a cell passed before entry to the dead-end cell, and sets to select a route other than the cell passing route determined last time as a route passing the cell. The backtracking is executed until a new passable cell is found.

The periphery of the work field is bordered with a fence, a ridge, or the like, to prohibit travel to outside the work field. It is also prohibited from approaching any obstacle like a rock, a tree, or a utility pole in the work field. Such travel prohibition is achieved by not selecting a cell passing route including entry to a cell within a travel prohibited area, for example, setting the weight of such a cell passing route to "zero" (selection prohibited). In view of this, according to the embodiments, the weights given to travels allocated by the travel weighting allocator include weights given to prohibition of travel out of the work vehicle and travel to an obstacle located in the work field.

An agricultural work vehicle typically travels in a field as a work field efficiently by repeating straight travel as long as possible. Such travel is achieved by allocating, to the cells not in a peripheral area, higher weights for straight travel than those for left turn and right turn. In view of this, according to the embodiments, the weights given to travels allocated by the travel weighting allocator include a weight prioritizing the straight travel.

Certain work does not allow the work vehicle to travel in an area already traveled once for work or requires the work vehicle to travel the area as less as possible. In view of this, according to the embodiments, the weighting changer changes the weights given to travels for prohibition of cell passing travel including entry to an already passed cell. In some cases, the weighting changer prohibits a cell passing route including entry to an already passed cell while allocating, to the cell passing route, a much lower weight than those of other cell passing routes.

Determination of a cell passing route at the entered cell in the travel of the work vehicle may be dependent on the cell passing route at the previously passed cell or at the further previously passed cell. In an area often covered by U-turn travel, right-angle turn travel, or the like, the weight at the entered cell is favorably changed in accordance with a travel locus just before the entry, to prioritize such turn travel. In view of this, according to the embodiments, the weighting changer changes the weights given to travel s which are allocated to the cell in accordance with a travel locus involving a plurality of cells continuously passed to reach the cell.

Certain work travel requires the work vehicle to cover the front of the work field with a work width of a mounted work device. In order to satisfy such a work specification, according to the embodiments, the interval at which the meshes are generated is set to a work width of the work vehicle or a work width obtained from the work width of the work vehicle in consideration of a predetermined overlapping amount. The work vehicle can thus work in all over the work field by generating the travel route including travel to all the cells and traveling along the travel route.

A certain work field has an entrance and an exit restricted for the work vehicle. In such a case, the work vehicle needs to generate a travel route having a start point at a cell corresponding to the entrance and an end point at a cell corresponding to the exit. In view of this, according to the embodiments, the travel route has a start point cell and an end point cell corresponding to an entrance-exit port of the work field.

INDUSTRIAL APPLICABILITY

The present invention is applicable to a work vehicle that works in a work field along a set travel route. The work vehicle can travel along the travel route either manually or automatically.

Obviously, numerous modifications and variations of the present invention are possible in light of the above teachings. It is therefore to be understood that within the scope of the appended claims, the invention may be practiced otherwise than as specifically described herein.

What is claimed is:

1. A travel route generating device for a work vehicle, comprising:
    a cell memory to store cell information with respect to cells obtained by dividing a topographical map of a work field in which the work vehicle works, the work field being surrounded by an outer periphery, the work field including a headland extending along the outer periphery and having a predetermined width from the outer periphery, the cells including headland cells provided in the headland and internal cells provided in an area surrounded by the headland in the work field;
    a travel probability memory to store a travel probability with respect to each of the cells, the travel probability including a left-turn travel probability, a straight travel probability, and a right-turn travel probability in the each of the cells; and
    circuitry configured to
        determine a travel direction in the each of the cells based on the travel probability of the each of the cells to generate a travel route, the work vehicle being configured to travel through the each of the cells in the travel direction; and
        change the travel probability with respect to each of affected cells among the cells such that the work vehicle is allowed to pass each of the headland cells multiple times and is prohibited from passing each of the internal cells multiple times, the affected cells being adjacent to determined cells among the cells, a travel direction in each of the determined cells having been determined.

2. The travel route generating device according to claim 1, wherein the circuitry is configured to execute backtracking when the work vehicle is configured to travel in a dead end cell in a state in which the cells include an untraveled cell whose travel direction is not determined.

3. The travel route generating device according to claim 1, wherein the travel probability includes a travel prohibition probability, and
    the circuitry is configured to determine the travel direction based on the travel prohibition probability to prohibit the work vehicle from traveling out of the work field and travelling in a cell with an obstacle.

4. The travel route generating device according to claim 1, wherein the straight travel probability in a cell is higher than the left-turn travel probability and the right-turn travel probability.

5. The travel route generating device according to claim 1, wherein the circuitry is configured to change the travel probability based on a travel locus defined by traveled cells through which the work vehicle has traveled.

6. The travel route generating device according to claim 1, wherein an interval of adjacent cells is set to a first work width of the work vehicle or a second work width obtained from the first work width of the work vehicle in consideration of a predetermined overlapping amount.

7. The travel route generating device according to claim 1, wherein a travel route to be generated has a start point cell and an end point cell corresponding to an entrance-exit port of the work field.

8. The travel route generating device according to claim 1, wherein the affected cells include an adjacent cell which is adjacent to a traveled cell whose travel direction is determined.

9. The travel route generating device according to claim 1, wherein the circuitry is configured to sequentially connect travel directions in the cells to generate the travel route.

10. The travel route generating device according to claim 1, wherein the circuitry is configured to control the work vehicle to travel according to the travel route.

11. The travel route generating device according to claim 1,
    wherein the circuitry is configured to generate a travel route based on the travel probability such that traveled cells of the cells which compose the travel route are maximized.

12. A method for generating a travel route for a work vehicle, comprising:
    dividing a topographical map of a work field to provide cells, the work vehicle being to work in the work field, the work field being surrounded by an outer periphery, the work field including a headland extending along the outer periphery and having a predetermined width from the outer periphery, the cells including headland cells provided in the headland and internal cells provided in an area surrounded by the headland in the work field;
    providing a travel probability with respect to each of the cells, the travel probability including a left-turn travel probability, a straight travel probability, and a right-turn travel probability in the each of the cells;
    determining a travel direction in the each of the cells based on the travel probability of the each of the cells to generate a travel route, the work vehicle being configured to travel through the each of the cells in the travel direction; and
    changing the travel probability with respect to each of affected cells among the cells such that the work vehicle is allowed to pass each of the headland cells multiple times and is prohibited from passing each of the internal cells multiple times, the affected cells being adjacent to determined cells among the cells, a travel direction in each of the determined cells having been determined.

13. The method according to claim 12,
    wherein the travel route is generated based on the travel probability such that traveled cells of the cells which compose the travel route are maximized.

14. A travel route generating device for a work vehicle, comprising:

cell memory means for storing cell information with respect to cells obtained by dividing a topographical map of a work field in which the work vehicle works, the work field being surrounded by an outer periphery, the work field including a headland extending along the outer periphery and having a predetermined width from the outer periphery, the cells including headland cells provided in the headland and internal cells provided in an area surrounded by the headland in the work field;

travel probability memory means for storing a travel probability with respect to each of the cells, the travel probability including a left-turn travel probability, a straight travel probability, and a right-turn travel probability in the each of the cells;

travel direction determining means for determining a travel direction in the each of the cells based on the travel probability of the each of the cells to generate a travel route, the work vehicle being configured to travel through the each of the cells in the travel direction; and travel probability changing means for changing the travel probability with respect to each of affected cells among the cells such that the work vehicle is allowed to pass each of the headland cells multiple times and is prohibited from passing each of the internal cells multiple times, the affected cells being adjacent to determined cells among the cells, a travel direction in each of the determined cells having been determined.

15. The travel route generating device according to claim 14, wherein the travel route is generated based on the travel probability such that traveled cells of the cells which compose the travel route are maximized.

* * * * *